United States Patent [19]

Moore et al.

[11] 4,446,303

[45] May 1, 1984

[54] PROCESS FOR PREPARING HIGH MOLECULAR WEIGHT POLYESTERS

[75] Inventors: Louis D. Moore; Mark Rule; Thomas H. Wicker, all of Kingsport, Tenn.

[73] Assignee: Eastman Kodak Company, Rochester, N.Y.

[21] Appl. No.: 517,485

[22] Filed: Jul. 26, 1983

[51] Int. Cl.$^3$ ........................ C08G 63/26; C08G 63/70

[52] U.S. Cl. .................................. 528/308.2; 525/437; 528/272; 528/480; 528/502

[58] Field of Search ...................... 528/272, 308.2, 480, 528/502; 525/437

[56] References Cited

U.S. PATENT DOCUMENTS

| | | | |
|---|---|---|---|
| 3,544,525 | 12/1970 | Balint et al. | 528/308.2 X |
| 3,728,309 | 4/1973 | Maxion | 528/308.2 X |
| 4,256,861 | 3/1981 | Davis et al. | 525/437 |
| 4,271,287 | 6/1981 | Shah | 528/308.2 |

*Primary Examiner*—Lucille M. Phynes

*Attorney, Agent, or Firm*—Donald W. Spurrell; Daniel B. Reece, III

[57] ABSTRACT

Disclosed is a process for the manufacture of high molecular weight polyesters, particularly poly(ethylene terephthalate) (PET) and modified PET, having inherent viscosities (I.V.) for example, above about 0.6, and up to about 1.3 or higher. Such polymers are useful, for example, as structural moldings, self-supporting sheets and films, and blow-molded bottles. The process involves one or more recrystallizations of the polymer incident to solid-state polycondensation, which recrystallizations, it has been discovered, restores the high polycondensation activity of the polymer experienced in the early stages thereof and allows greatly increased overall build-up rate and higher final I.V. for the total polycondensation period. The process is particularly applicable to crystallizable polyesters in general which lend to solid-state build-up.

7 Claims, No Drawings

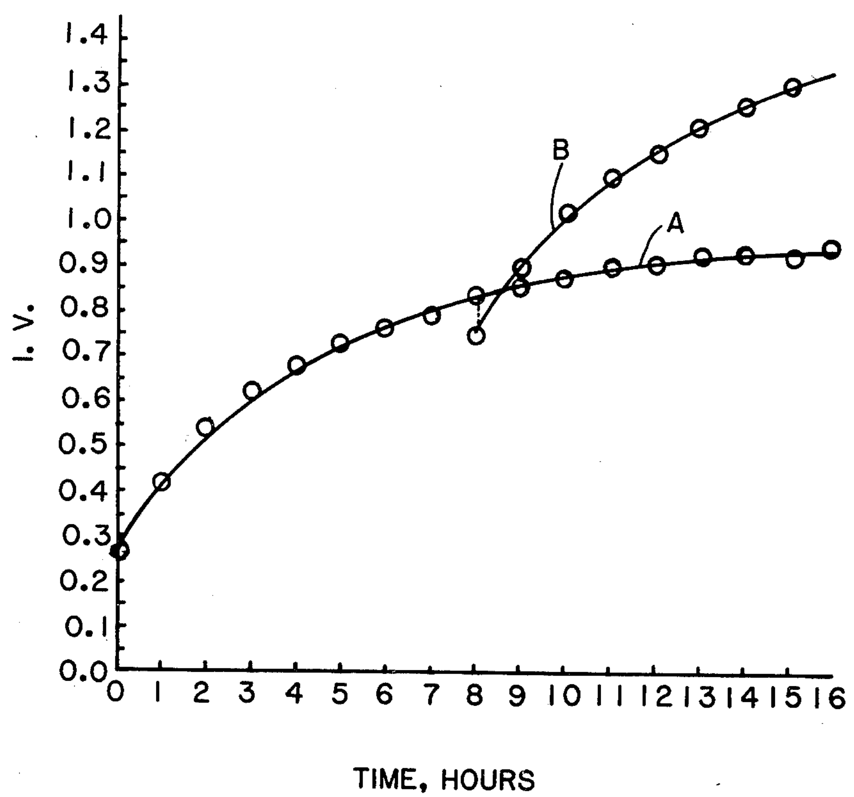
PLOT OF I. V. vs. TIME DATA OF PET WITH AND WITHOUT REMELTING AFTER SPECIFIED HOURS
I. V.
1.4
1.3
1.2
1.1
1.0
0.9
0.8
0.7
0.6
0.5
0.4
0.3
0.2
0.1
0.0
B
A
0 1 2 3 4 5 6 7 8 9 10 11 12 13 14 15 16
TIME, HOURS

PROCESS FOR PREPARING HIGH MOLECULAR WEIGHT POLYESTERS

DESCRIPTION

This invention concerns a novel process for the manufacture of high molecular weight polyesters, particularly poly(ethylene terephthalate) (PET) and modified PET, having inherent viscosities (I.V.), for example, above about 0.6, and up to about 1.3 or higher. The process employs one or more step combinations involving melting and recrystallizing the polymer incident to solid-state, I.V. build-up, which, it has been discovered, restores the polycondensation activity of the polymer to levels experienced in the early stages of the solid-stating and results in greatly increased overall I.V. build-up rate and higher final I.V. for the total polycondensation period.

The present invention is applicable to polyesters in general which lend to solid-state, I.V. build-up, and particularly to polyesters which tend to crystallize during polycondensation. The invention applies particularly to PET and PET modified with up to about 15 mole % of each of modifying acid and modifying glycol comonomer, said percentages being based on total acid and total glycol respectively. The operation of the process is independent of polycondensation catalyst type and the tendency of the polymer to crystallize, however, the more highly crystallizable polymers benefit the most since they tend to experience greater reduction in polycondensation activity during solid-stating. Also, the starting polyester need not be crystallized as in U.S. Pat. No. 4,161,578, prior to beginning the polycondensation reaction, although such would be desirable for certain polyesters.

Poly(ethylene terephthalate) is typically prepared from prepolymer (oligomer or monomer) which has an I.V., for example, from about 0.008 to about 0.1 and is formed by esterification of terephthalic acid or by transesterification of dimethyl terephthalate with ethylene glycol in the presence of a catalyst such as $Mn(OAc)_2$ or titanium tetraisopropoxide in a concentration, for example, of from about 45 to about 145 ppm. Art recognized components of this prepolymer are bis(hydroxyethyl) terephthalate and oligomers thereof. The prepolymer is then typically polycondensed in the melt-phase under vacuum at high temperatures and in the presence of a polycondensation catalyst such as antimony or titanium compound. Because of the increase in viscosity of the polymer melt with increase in molecular weight, this method of polycondensation is usually limited to the preparation of polymer having an I.V. of about 0.60 or less.

A typical transesterification and melt-phase I.V. build-up is as follows:

145.5 grams (0.75 mole) of dimethyl terephthalate, 89.0 grams (1.44 mole) of ethylene glycol, 32.8 grams (0.23 mole) of 1,4-cyclohexanedimethanol, and 120.0 ppm of Ti (based on total reactant weight) catalyst, added as titanium tetraisopropoxide, are added to a 500-ml round-bottom flask fitted with a stirrer, condensate take off, and nitrogen inlet head. The flask and contents are immersed in a Woods metal bath at approximately 170° C. The temperature is raised to 195° C. and maintained for two hours and twenty minutes while ester exchange of the dimethyl terephthalate, ethylene glycol, and 1,4-cyclohexanedimethanol takes place. During all of the above reactions, a nitrogen purge of approximately two cubic feet/hour is maintained over the reactants. The temperature is then raised to 285° C., the melt placed under 0.10 mm vacuum and polycondensation continued for 30 minutes. The I.V. of the copolyester is about 0.6 or lower.

In order to increase the I.V. of such polymers, the polymer obtained in this melt-phase process is comminuted (pelletized, powdered or pulverized), dried, crystallized, for example, by heating the agitated particles at about 180° C. to about 220° C., and then polycondensed in the presence of a catalyst such as about 50 to about 400 ppm of Sb added as $Sb(OAc)_3$, at temperatures of from about 200° C. to below about the sticking point of the polyester, i.e., about 200° C. to about 235° C. for PET, preferably 210° C. to 220° C., under inert gas flow such as nitrogen. Such solid-stating is described in the literature, for example, in the aforesaid U.S. Pat. No. 4,161,578 and British Pat. No. 1,066,162, the disclosures of which are incorporated herein by reference. A problem associated with such conventional solid-stating, however, is that the rate of increase in I.V. falls off dramatically after a few hours, and very long polycondensation periods are thereafter required to obtain polymer of sufficiently high I.V. for such use as structural moldings, self-supporting sheets and films, blow-molded bottles, and the like.

In accordance with the present invention, the initial solid-state or polycondensation activity of the polyester is restored by melting and recrystallizing the polymer one or more times, preferably once or twice, and most preferably once, during the solid-stating. Much greater overall polycondensation rates can thus be realized and high I.V. polymer can be obtained in more reasonable production times.

The diol component from which the present polyesters are prepared comprises one or a mixture of 1,4-cyclohexanedimethanol and ethylene glycol in all proportions, and can also include minor amounts, up to about 15 mole % total of one or a mixture of modifying diols such as 1,2-propanediol, 1,3-propanediol, 1,2-butanediol, 2,3-butanediol, 1,3-butanediol, 1,4-butanediol, 2,2-dimethyl-1,3-propanediol, 2,3-propanediol, 1,6-hexanediol, 2-ethylhexanediol, 1,2-cyclohexanediol, 1,4-cyclohexanediol, 1,2-bis(hydroxymethyl)cyclohexane, 1,3-bis(hydroxymethyl)cyclohexane, and diols containing one or more oxygen atoms in the chain, e.g., diethylene glycol, triethylene glycol, dipropylene glycol, and tripropylene glycol. In general, the useful modifying diols contain 3 to 18, preferably 3 to 12 carbon atoms. Cycloaliphatic diols can be employed in their cis or trans configuration or as mixtures of both forms.

The acid component of the present polyesters comprises terephthalic acid and up to about 15 mole % total of one or a mixture of acids such as isophthalic, hexahydroterephthalic, tetrahydrophthalic, hexahydrophthalic, hexahydroisophthalic, endomethylene and endoethylenetetrahydrophthalic, hexachloroendomethylenetetrahydrophthalic, tetrabromophthalic, succinic, glutaric, adipic, suberic, sebacic, decanedicarboxylic, 2,2,4-trimethyladipic, maleic, fumaric, itaconic and citraconic. The term "acid" includes the anhydride and other reactive species such as esters, e.g., dimethyl terephthalate, halides and the like of the various acids listed above.

The invention in its broader aspects is defined as the process for solid-state polycondensing crystallizable, comminuted polyester comprising carrying out one or more times, the intermediate step combination of removing said polyester from the reaction zone after a period of polycondensation, melting, recrystallizing, recomminuting said polyester, and reintroducing the comminuted polyester into said reaction zone and continuing said polycondensation. More particularly, the polycondensation is carried out at a temperature of from about 180° C. to below about the sticking point of said polyester until the desired I.V. is obtained. It is particularly noted that the terms "sticking point" as used herein denoted temperatures which range from where the polymer particles just begin to tend to stick to each other to where sufficient sticking and agglomeration of the particles occurs to seriously inhibit the necessary flow of polymer from the solid-stating reactor. The term "below" therefore, actually can encompass temperatures at which some sticking and agglomeration occurs, but which temperatures are still at an operable level.

In preferred embodiments of the present invention, the polyester prior to solid-stating has an I.V. of less than about 0.6, the solid-stating (reaction zone) temperature is between about 200° C. and 235° C., the intermediate step combination is carried out once during the polycondensation when an I.V. between about 0.75 and about 0.85 is reached, and the polyester is selected from (1) PET, (2) PET modified with from about 0.5 to about 4.0 mole % of diethylene glycol based on total glycol, and (3) said modified PET further modified with from about 5.0 to about 40 mole % of 1,4-cyclohexanedimethanol based on total glycol.

The inherent viscosities (I.V.) herein are expressed in deciliters/gram and are determined according to ASTM D2857-70 procedure, in a Wagner Viscometer of Lab Glass Inc. of Vineland, N.J. having a ½ ml. capillary bulb, using a polymer concentration of 0.5% by weight in 60/40, phenol/tetrachloroethane, by weight. The procedure is carried out by heating the polymer-solvent system at 120° C. for 15 minutes, cooling the solution to 25° C. and measuring the time of flow at 25° C. The I.V. is calculated from the equation $$\{n\}^{25^\circ C}_{0.50\%} = \frac{\ln \frac{t_s}{t_o}}{C}$$

wherein:

{n}=inherent viscosity at 25° C. at a polymer concentration of 0.50 g./100 ml. of solvent;

ln=natural logarithm;

$t_s$=sample flow time;

$t_o$=solvent-blank flow time; and

C=concentration of polymer in grams per 100 ml. of solvent=0.50.

The practice of this invention is illustrated in the Graph wherein Curve A represents the solid-state polycondensation of PET powder for 16 hours at 215° C. in a conventional plug-flow, fixed-bed reactor such as disclosed in said U.S. Pat. No. 4,161,578. The powder size was about 300 to about 600 microns and had an initial I.V. of about 0.27. After an initial rapid increase in I.V., the rate decreased drastically. Curve B resulted from a portion of the PET powder which was removed after eight hours, melted, crystallized by heating for 30 minutes at 180° C., and polycondensed under identical conditions as the original polymer powder. It is readily apparent that the recrystallized polymer regained its initial high polycondensation activity and attained a much higher I.V. after 16 hours than possible with the untreated polymer.

The invention has been described in detail with particular reference to preferred embodiments thereof, but it will be understood that variations and modifications can be effected within the spirit and scope of the invention.

We claim:

1. The process for solid-state polycondensing crystallizable, comminuted polyester comprising carrying out one or more times the intermediate step combination of removing said polyester from the reaction zone after a period of polycondensation, melting, recrystallizing, recomminuting the polyester, and reintroducing the recomminuted polyester into said reaction zone and continuing said polycondensation until the desired I.V. is obtained.

2. The process of claim 1 wherein the polyester has an initial I.V. of less than about 0.6, and the reaction zone temperature is between about 180° C. and below about the sticking point of the polyester.

3. The process of claim 1 or 2 wherein the polyester is prepared from: (a) one or both of 1,4-cyclohexanedimethanol and ethylene glycol in all proportions, and up to about 15 mole % based on total glycol of one or a mixture of 1,2-propanediol, 1,3-propanediol, 1,2-butanediol, 2,3-butanediol, 1,3-butanediol, 1,4-butanediol, 2,2-dimethyl-1,3-propanediol, 2,3-propanediol, 1,6-hexanediol, 2-ethylhexanediol, 1,2-cyclohexanediol, 1,4-cyclohexanediol, 1,2-bis(hydroxymethyl)cyclohexane, 1,3-bis(hydroxymethyl)cyclohexane, diethylene glycol, triethylene glycol, dipropylene glycol and tripropylene glycol; and (b) terephthalic acid and up to about 15 mole % based on total acid of one or a mixture of isophthalic hexahydroterephthalic, tetrahydrophthalic, hexahydrophthalic, hexahydroisophthalic, endomethylene and endoethylenetetrahydrophthalic, hexachloroendomethylenetetrahydrophthalic, tetrabromophthalic, succinic, glutaric, adipic, suberic, sebacic, decanedicarboxylic, 2,2,4-trimethyladipic, maleic, fumaric, itaconic and citraconic acids.

4. The process of any of claims 1, 2 or 3 wherein said intermediate step combination is carried out once during the polycondensation.

5. The process of any of claims 1, 2, 3 or 4 wherein the polyester is poly(ethylene terephthalate) and the polycondensation is carried out at temperatures from about 200° C. to about 235° C.

6. The process of any of claims 1, 2, 3 or 4 wherein the polyester is poly(ethylene terephthalate) modified with from about 0.5 to about 4.0 mole % of diethylene glycol and from about 5.0 to about 40.0 mole % of 1,4-cyclohexanedimethanol, said percentages being based on total glycol.

7. The process of claim 1 wherein the polyester is poly(ethylene terephthalate) having an initial I.V. less than about 0.6, the polycondensation is carried out at temperatures from 210° C. to 220° C., and said intermediate step combination is carried out when an I.V. of between about 0.75 and about 0.85 is reached.

* * * * *